Figure 1:
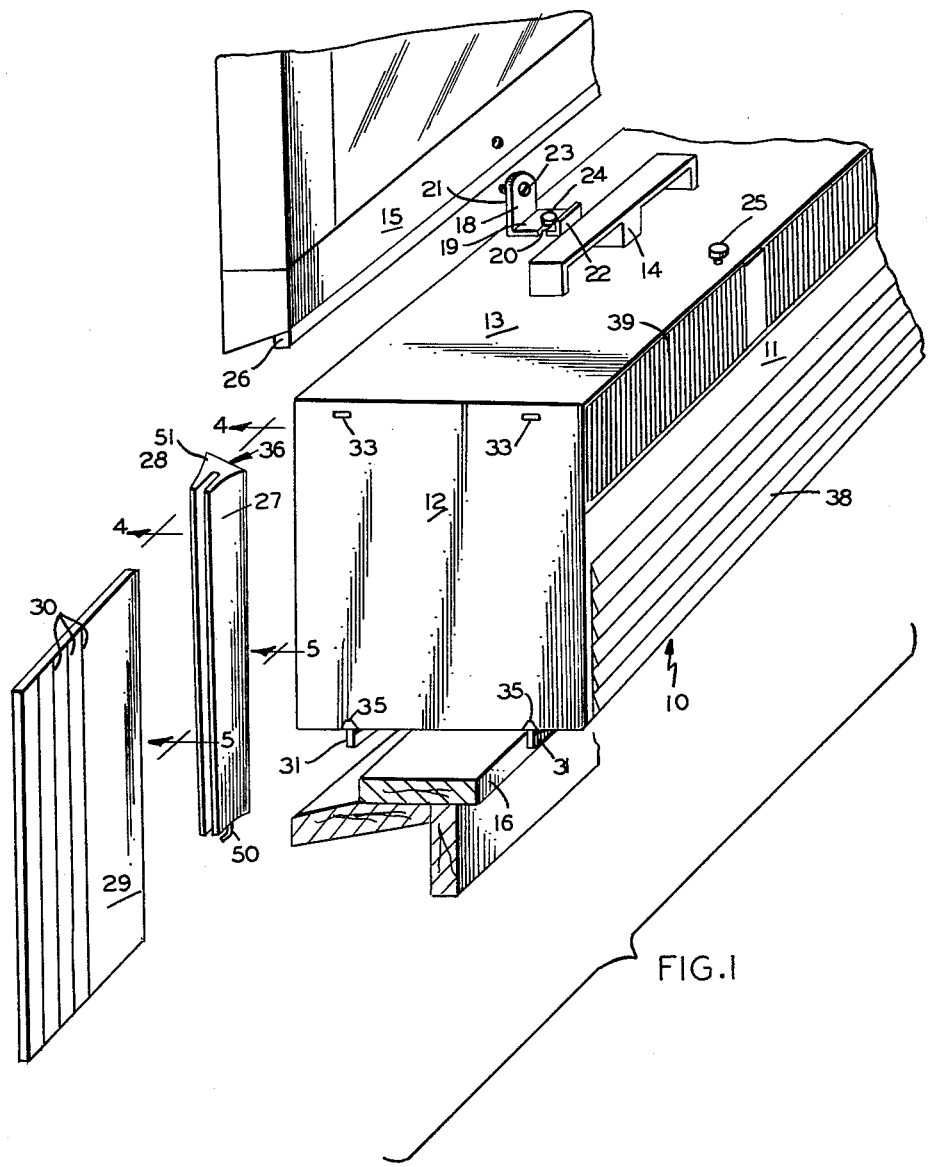

Aug. 7, 1962 D. E. MacLEOD 3,048,095
MOUNTING ARRANGEMENT FOR AIR CONDITIONERS
Filed May 11, 1959 2 Sheets-Sheet 2

INVENTOR.
DAVID EARLE MacLEOD
BY Herman Seid
ATTORNEY

United States Patent Office 3,048,095
Patented Aug. 7, 1962

3,048,095
MOUNTING ARRANGEMENT FOR AIR
CONDITIONERS
David Earle MacLeod, Syracuse, N.Y., assignor to Carrier Corporation, Syracuse, N.Y., a corporation of Delaware
Filed May 11, 1959, Ser. No. 812,522
6 Claims. (Cl. 98—99)

This invention relates to a mounting arrangement for air conditioners and more particularly to a mounting arrangement adapted to provide an air tight seal for room air conditioners.

Room air conditioners of the type which are placed in a window when in use generally require some type of sealing means between the sides of the air conditioner unit and the edges of the window in which they are placed. Because of the wide variations in width of the different kinds of windows in which it may be desirable to place an air conditioner of this type, it is frequently also necessary to provide a side panel which may be cut to the desired width to fill the space between the sides of the air conditioner and the sides of the window. In such cases, the sealing means must provide an air tight seal between the side panel and the air conditioner. It is also desirable that the construction used in fitting the air conditioner in the window be readily removable both from the air conditioner and the window so that the air conditioner may be moved from room to room and positioned in other windows at the user's convenience.

The solution to the problem of devising a simple, efficient and removable construction for fitting an air conditioner into a window has become especially important with the increased availability of light-weight, so called "portable" room air conditioning units. In addition where the air conditioning unit is designed for use either as a room cooler or heat pump, depending on its position in the window, it is desirable that the construction employed for fitting the unit in the window be easily relocated on the unit to adapt it for either type of service.

Since efficient operation of an air conditioning unit of this type also requires a tight seal between the top of the air conditioner and the sash of the window in which it is used, it is desirable to provide a sealing gasket at that point having no more height than necessary above the top of the air conditioner so as to permit the use of small and unobtrusive fixtures to secure the air conditioner to the bottom of the sash thereby preventing its tilting in the window, unauthorized raising of the sash and at the same time presenting an esthetically pleasing appearance.

Accordingly it is the principal object of this invention to provide a simple and efficient construction for removably fitting an air conditioner in a window.

It is a further object of this invention to provide a simple and easily removable seal for the sides of an air conditioner which will permit the use of a relatively thin gasket between the top of the air conditioner and a window sash and present a neat and attractive appearance when installed in a window.

These and other objects of this invention which will become apparent by reference to the following description and annexed drawings, are achieved by employing a resilient gasket on each side of the air conditioning unit which is hooked into sealing engagement with the air conditioner and which is provided with a slot to sealingly receive a side panel, and a thin soft gasket across the bottom of the sash.

Figure 2:
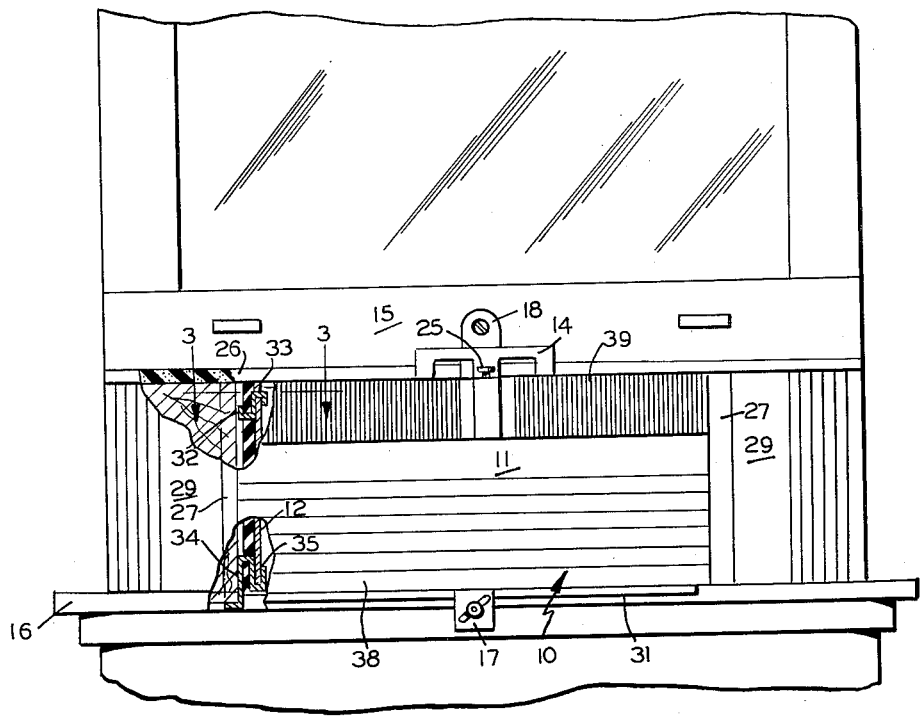
Figure 4:
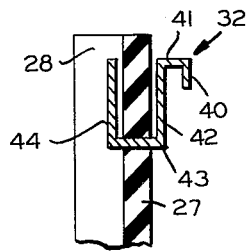
Figure 5:
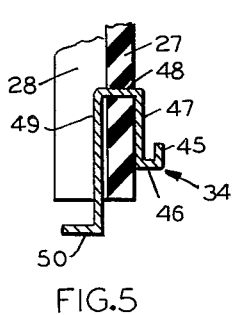
Figure 3:
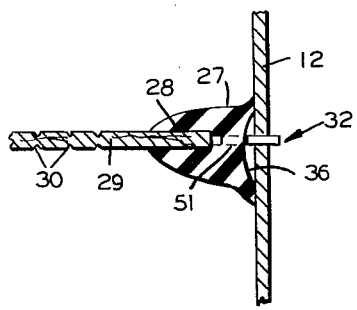

FIGURE 1 shows an exploded view of an air conditioning unit embodying this invention;
FIGURE 2 shows a front view of an air conditioner according to this invention with portions broken away to disclose the hooks which hold a side gasket in place;
FIGURE 3 shows an enlarged cross sectional view taken on line III—III of FIGURE 2;
FIGURE 4 shows an enlarged cross section detail taken on line IV—IV of FIGURE 1; and
FIGURE 5 shows an enlarged cross section view taken on line V—V of FIGURE 1.

Referring more particularly to the drawings, like reference characters are used throughout to designate corresponding parts. Referring particularly to FIGURE 1, an air conditioner unit having a box like housing 10 with a front panel 11 and flat sides 12 is shown positioned on window stool 16 by abutment therewith of legs 31 attached to the bottom of the air conditioner.

The air conditioning unit of this invention may be of the room air conditioner or portable type and is generally similar to that disclosed in co-pending application, Serial No. 762,596, filed September 22, 1958, now Patent 2,945,358, in the names of D. E. MacLeod and H. J. Tyler which discloses certain features of the instant invention. Air conditioners of this type are generally divided into front and rear compartments by a partition. One compartment contains an evaporator and has an evaporator air inlet and outlet. The other compartment contains the condenser and has a condenser air inlet and outlet. As shown in FIGURE 1, the air conditioner has a front panel 11 with evaporator air inlet louvers 38 and evaporator air outlet louvers 39. As disclosed in the above mentioned co-pending application, the air conditioner may also have a rear panel of the same or similar construction having condenser air inlet and outlet louvers. Top 13 of housing 10 may have a handle 14 to facilitate carrying the unit from one location to another and the unit may have legs 31 which are spaced on the bottom of the housing so as to position the unit with the proper amount of overhang with respect to window stool 16, as will be explained further.

As also disclosed in the above co-pending application, a suitable means may be provided on the bottom of the unit to clamp it to the window stool such as stool clamp 17 shown in FIGURE 2.

The top 13 of housing 10 may be provided with means to secure the unit to the sash of the window in which it is positioned. As shown in FIGURE 1 this means may comprise a swinging lock 18 having a bottom portion 19 with a slot 20 for reception of a headed pin 24 or 25 secured to the top 13 of the air conditioner unit. The swinging lock 18 has an upwardly extending arm 21 secured to sash 15 by screws 23 about which the lock may pivot into or out of engagement with headed pin 24 or 25 depending on the position of the air conditioner in the window. Upwardly extending arm 22 forms a convenient handle for the manipulation of the lock 18.

As shown in FIGURES 1 and 2, housing 10 of the air conditioner is positioned in a window between stool 16 and sash 15. Top gasket 26 is cemented or otherwise secured to the bottom of sash 15 and is of such a thickness as to seal sash 15 against top 13 of the housing when the sash is brought down to rest on the top of the housing. Top gasket 26 may be of any convenient material which provides a good seal with the top of the air conditioner. It has been found that a relatively thin strip of sponge rubber forms a convenient gasket at this point and is sufficiently deformable to compensate for unevenness which may be present in the sash due to its having been warped by exposure to the weather. Top gasket 26 also tends to compensate for possible misalignment of the window sash in the window frame but is not of sufficient thickness to prevent the sash from being brought at least nearly in contact with the top 13 of the air conditioner.

The air conditioner unit is fitted into the window by means of relatively thin side panels 29 which may be made of any suitable material and have score lines 30 which facilitate breaking the side panels to the proper size for a particular window.

Side gaskets 27, which may be of a resilient rubber-like material, have a concave portion 36 for sealing engagement with the sides 12 of the air conditioner separated by web 51 from a slot 28 of a width to sealingly engage side panels 29. Slots 28 also serve to hold the side panels 29 in position along the side of the air conditioner. Gasket 27 is secured to side 12 by top hook-like member 32 received in aperture 33 in side 12 and bottom hook-like member 34 received in notch 35 in side 12 as shown in FIGURE 2.

Top hook 32 is shown in detail in FIGURE 4 and has a first vertical portion 40, a first horizontal portion 41, a second vertical portion 42, a second horizontal portion 43 and a third vertical portion 44 which form a generally S shaped hook. Portions 40, 41 and 42 form a plate or housing receiving portion adapted to receive side 12 of the air conditioner when received in apertures 33, and portions 42, 43 and 44 form a portion adapted to receive gasket 27 adjacent one end as shown in FIGURE 4.

As shown in detail in FIGURE 5 bottom hook 34 has a first vertical portion 45 and first horizontal portion 46, a second vertical portion 47, a second horizontal portion 48, a third vertical portion 49 and a finger portion 50. Portions 45, 46 and 47 of bottom hook 34 form a plate or housing-receiving portion adapted to engage in notches 35 shown in FIGURE 1 and portions 47, 48 and 49 form a portion adapted to receive gasket 27 adjacent its end. As can be seen from a comparison of FIGURE 4 and FIGURE 5, hook 45 is generally similar to hook 32 except that it additionally has finger 50 which may be spaced below the bottom of the gasket 27, when the hook is positioned adjacent the end of the gasket 27 as shown in FIGURE 5. The hooks may be positioned in the gasket by being pushed through the soft rubber-like material of the web 51 or a slot may be pre-formed in the web at the proper location from the top and the bottom of each gasket and the hooks thereafter poked through the slots.

Apertures 33 and notches 35 are formed in sides 12 of the air conditioner. As many sets of notches and apertures may be provided in sides 12 as there are contemplated positions for gaskets 27, it being understood that one notch 35 and one aperture 33 is all that is required to position gasket 27 in a given position on casing 10. The sets of notches and apertures are therefore spaced on sides 12 at the locations where it is contemplated that side panels 29 will come on the air conditioner for various positions of the air conditioner in a window. Two spaced sets of notches 35 and apertures 33 are shown in FIGURE 1.

In operation the air conditioner is placed in a window with either the front panel or the rear panel facing into the room, depending on whether it is desired to use the air conditioner as a room cooler or a heat pump. It will, of course, be understood that if the front panel containing evaporator air inlet and outlet are facing into the room that the unit will operate as a room cooler. On the other hand, if the condenser air inlet and outlet are facing into the room the unit will act as a heat pump tending to warm the air in the room.

The unit may be designed with more overhang inside the room, for example, than outside the room. The amount of overhang can be conveniently controlled by the location of legs 31. Legs 31 are therefore located so that by abutting one of them against the edge of window stool 16 the air conditioner is properly positioned with respect to the window stool and the correct amount of overhang is achieved. Whether or not the amount of overhang inside the room is different from that outside the room, the side panels 29 will meet the side 12 of the air conditioner at a different location depending upon whether the air conditioner's front panel is facing into the room or outwardly of the room. Both of these positions are predetermined and a notch 35 and a corresponding aperture 33 is provided in the side of the air conditioner for both contingencies.

The user selects the proper notch and aperture corresponding to the desired position of the side gasket for the use to which the air conditioner is to be put and inserts the plate or housing receiving portions of bottom hook 34 into the selected notch 35. He then attaches the top hook 32 by engaging the plate or housing receiving portion thereof into aperture 33.

Desirably the top hook 32 is spaced on side gasket 27 from bottom hook 34 a distance such that the plate receiving portions at 41 and 46 respectively of the two hooks are slightly closer together than the distance between notch 35 and aperture 33. If the side gasket 27 is made of resilient rubber-like material then the gasket is longitudinally stretched in assembling it with the air conditioner and its elasticity will hold the hooks in firm engagement with the side of the air conditioner.

As previously stated, finger 50 of bottom hook 34 is spaced slightly below the bottom edge of gasket 27. Gasket 27 is of substantially the same length as the height of the air conditioner with which it is used. The finger 50 does not interfere with assembly of the gasket in the final unit because while it projects below the bottom of the air conditioner unit it is located just slightly behind the window stool 16 where it is permitted to depend from the bottom of the air conditioner by reason of the thickness of the stool. After the side gaskets are assembled in the manner above described with the air conditioner the side panels 29 may be conveniently inserted in the slot 28 in the top of the side gasket 27.

Side panels 29 are properly sized to just fit between the side of the window and the webs 51 of the side gaskets 27 by breaking them along the proper score line 30. The side panels 29 are then forced downwardly through the slot 28 until they reach finger 50 which acts as a stop. The stop 50 performs the function of locating the bottom of side panel 29 in precisely predetermined relation with the bottom of the air conditioner and with a predetermined amount of overlap with the portion of the stool 16 extending beyond the sides of the air conditioner, thereby providing an effective seal with the stool.

After the top gasket 26 is cemented or otherwise secured to sash 15, the sash is brought down into sealing relation with top 13 of the air conditioner, the gasket 26 being of sufficient height to assure a seal along the top of the air conditioner and the tops of side panels 29. Any desired means is then employed to secure the top 13 of the air conditioner to the sash 15. The means illustrated in the drawing comprises swinging lock 18 which is pivoted into engagement with either headed pin 24 or headed pin 25 depending upon which way the air conditioner is placed in the window. Slot 20 is of a width greater than the shank of pin 24 but less than that of the head. Bottom portion 19 pivots beneath the head of pin 24 for locking, and prevents tilting of the air conditioner in the window or unauthorized raising of the sash. A stool clamp 17 may also be applied at the bottom of the unit to more securely position the air conditioner in the window.

It will be appreciated that the swinging lock 18, as shown in the drawing is merely illustrative and other attachment means may be alternatively employed, such as that shown in co-pending application, Serial No. 762,596, filed September 22, 1958, referred to above, comprising an eccentrically mounted knurled knob in conjunction with a fixed stop bracket mounted on either side of the sash. It will be noted that top gasket 26 may be relatively thin with respect to the width of side gasket 27 and that sash 16 may actually contact or nearly contact top 13 of the air conditioner in the construction described.

By the described construction the sash is permitted to closely approach the top of the air conditioner while at the same time making an effective, simple and inexpensive seal therewith which thus enables the use of inconspicuous and aesthetically pleasing fixtures for securing the sash to the top of the air conditioner because the fixtures need not be excessively tall in order to obtain a proper and firm contact with the sash, as would be the case if a gasket having substantial height were used across the top of the air conditioner.

If it is desired to reverse the position of the air conditioner to employ it in its alternative use, it is only necessary to detach the lock or other sash securing means from engagement with the air conditioner or sash, raise the window, remove the side panels, reverse the air conditioner abutting the stool against the opposite leg, move the side gaskets from one set of notches and apertures to the other, reassemble the side panels in the side gaskets, bring the sash down on top of the unit again and re-lock the sash securing means. If the sash securing means comprises a pivoted hook as shown in FIGURE 1 it will be understood that when the air conditioner is reversed in the window the pivoted lock will be engaged under the other headed pin from that with which it was first engaged.

The described mounting arrangement for an air conditioner possesses the advantage of more accurately positioning the side gaskets on the side panel of the air conditioner by reason of the exact engagement of the gasket hooks at their respective apertures and notches than is provided by prior constructions. Furthermore, since the top gasket seals the window sash with both the top of the air conditioner and the top of the side panels the need for a plurality of gaskets to serve this function is obviated with a resultant economy of materials and labor required for the installation of the air conditioner in a window.

While there has been described and shown a preferred form of this invention it will be understood that the same may be otherwise embodied within the scope of the appended claims:

I claim:

1. In combination with an air conditioning unit of the type adapted to be positioned in a window in a plurality of positions and having a pair of opposite sides each with a plurality of pairs of vertically spaced means, each of said spaced means being adapted to engage one of a pair of hook-like clips, said plurality of pairs of spaced means being spaced along the width of said sides of the air conditioning unit to permit positioning of a side gasket in a corresponding plurality of positions along one of said sides of said unit, a mounting arrangement comprising a side panel fitted between the side of the window and said one side of said air conditioning unit, said gasket being resilient and substantially coextensive with the height of said one side of said air conditioning unit and secured in sealing relation with said one side and in sealing engagement with said side panel, and said pair of hook-like clips each having a portion receiving said gasket adjacent an end thereof and a portion receiving one of said spaced means of a pair thereof on said one side of the air conditioning unit.

2. A combination as defined in claim 1 wherein said hook-like clips are positioned in a vertical plane and the lowermost hook-like clip is provided with a horizontally extending finger and serves to support said side panel in a vertical plane at a predetermined vertical position with respect to said one side of said air conditioning unit.

3. A mounting arrangement for an air conditioning unit of the type adapted to be positioned in a window, said mounting arrangement including an elongated resilient gasket having a length substantially equal to a side of said air conditioning unit which is to be sealingly engaged with an adjacent member, said side of said air conditioning unit having aligned spaced hook receiving portions thereon for receiving a hook-like member, said elongated gasket having a rigid hook-like member secured thereto adjacent both ends thereof, said hook-like members being spaced from each other along said gasket, both of said hook-like members including a gasket receiving portion engaged with said gasket and another portion for engaging and receiving one of said spaced hook receiving portions on said side of the air conditioning unit, said hook receiving portions being spaced apart a distance slightly greater than the distance between said another portions of said hook-like members on said gasket so as to place said gasket under tension due to its resiliency when secured to the side of said air conditioning unit by said hook-like members thereby retaining said gasket firmly in place in sealed engagement with said unit.

4. A mounting arrangement as defined as in claim 3 wherein said hook-like clips are positioned in a vertical plane and the lowermost hook-like clip is provided with a horizontally extending finger and serves to support said side panel in a vertical plane at a predetermined vertical position with respect to said one side of said air conditioning unit.

5. A mounting arrangement for an air conditioning unit operable to cool a room and which is adapted to be positioned in a window of a room in a plurality of predetermined orientations, comprising a housing for enclosing said air conditioning unit, said housing comprising a side having a plurality of vertically spaced pairs of spaced aligned gasket mounting means, said pairs of gasket mounting means corresponding with a predetermined desired location of a gasket seal on the side of said housing edpendent on the desired modes of orientation of said housing in said window, a resilient elongated gasket having a length substantially coextensive with the height of said side of said housing, a gasket securing member secured in engagement with said gasket adjacent both ends thereof, said gasket securing members being spaced from each other a predetermined distance apart, said distance having a corresponding relation to the spacing between aligned gasket mounting means of a pair thereof, both said gasket securing members having portions thereon for engaging said gasket mounting means so that said gasket may be positioned on the side of said housing in a plurality of predetermined desired locations to accommodate various modes of orientation of said housing in a window in which it is to be sealingly mounted.

6. A mounting arrangement as defined in claim 5 wherein said hooks are rigid and wherein the spacing between aligned gasket mounting means of a pair thereof is slightly greater than the distance between corresponding portions carried by said gasket for receiving said gasket mounting means so that when said gasket is assembled on the side of said housing by engagement of said gasket mounting means and said gasket securing members, the gasket is placed under tension and is retained on said housing due to the resiliency of said gasket.

References Cited in the file of this patent

UNITED STATES PATENTS

| | | |
|---|---|---|
| 2,234,771 | Moore | Mar. 11, 1941 |
| 2,294,664 | Hubbard | Sept. 1, 1942 |
| 2,322,904 | Williams | June 29, 1943 |
| 2,433,104 | Eberhart | Dec. 23, 1947 |
| 2,452,950 | Morrison | Nov. 2, 1948 |
| 2,548,327 | Spear | Apr. 10, 1951 |
| 2,638,642 | Spraragen | May 19, 1953 |
| 2,644,390 | Delf et al. | July 7, 1953 |
| 2,719,343 | Harris | Oct. 4, 1955 |
| 2,799,062 | Callan | July 16, 1957 |